United States Patent
Rudolph et al.

(10) Patent No.: US 6,410,909 B1
(45) Date of Patent: Jun. 25, 2002

(54) DEVICE FOR THE DETERMINATION OF THE DEGREE OF RELATIVE ROTATION BETWEEN TWO PARTS

(75) Inventors: Gerd Rudolph, Aspisheim; Klaus Schnell, Gau-Algeshelm; Markus Leuschner, Bretzenheim, all of (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/287,851

(22) Filed: Apr. 7, 1999

(30) Foreign Application Priority Data

May 2, 1998 (DE) .......................................... 198 19 664

(51) Int. Cl.⁷ ................................................. G01D 5/34
(52) U.S. Cl. ............................ 250/231.13; 250/231.18; 439/164
(58) Field of Search ....................... 250/231.13–231.18, 250/232, 233; 341/13; 356/138; 701/41; 439/164, 488

(56) References Cited

U.S. PATENT DOCUMENTS 5,243,188 A * 9/1993 Hattori et al. ......... 250/231.17
5,734,160 A * 3/1998 Chung et al. .......... 250/231.13
5,900,930 A * 5/1999 Simon et al. ............... 356/138

* cited by examiner

*Primary Examiner*—Que T. Le
*Assistant Examiner*—Thanh X. Luu
(74) *Attorney, Agent, or Firm*—Rader, Fishman & Grauer PLLC

(57) ABSTRACT

A device for the determination of the degree of relative rotation between two parts or members with respect to each other about a main axis, the device comprising a first detector arrangement, which includes a rotation-imparting element and produces precise information indicating a relative angular position of the two members within the range of 0° and 360°, and comprising a second detector arrangement, which produces approximate information in order to be able to distinguish between full rotations. The second detector arrangement comprises a gear drive (40, 45, 75, 71) driven by the relative rotary motion of the two members and an absolute position sensor (23, 73) for the determination of the position of a measuring element (76) moved by the gear drive (40, 45, 75, 71). The dimensions of the gear drive (40, 45, 75, 71) are such that the maximum possible range of relative rotation between the two members parts corresponds to a range of motion of the measuring element (76), within which range all positions can be distinguished from each other in a geometric manner and which range can be resolved by the position sensor (23,73) at a resolution corresponding at least to the full rotations between the two members.

1 Claim, 3 Drawing Sheets

DEVICE FOR THE DETERMINATION OF THE DEGREE OF RELATIVE ROTATION BETWEEN TWO PARTS

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to a device for the determination of the degree of relative rotation between two parts or members with respect to each other about a main axis, said device comprising a first detector arrangement, which includes a rotation-imparting element and produces precise information indicating a relative angular position of the two parts within a range of 0° and 360° C. and comprising a second detector arrangement, which produces information in order to be able to distinguish between full rotations.

Many such devices have been known and are used for the detection of actual values in control and regulating systems, whereby, a first part represents a stationary "stator," in which the second part, the "rotor," is supported in a rotatable manner. The rotor may be the rotor of any motor or the shaft of any gear drive or measuring device; and, the stator may be the stator of the motor or a housing or a mount. The preferable, however, not exclusive field of application of the invention herein, is the determination of the relative rotation of the steering wheel of a motor vehicle. In a steering wheel application, the rotor is the steering wheel shaft and the stator is the steering wheel mount or steering column.

Generally, rotation-imparting elements with analog or digital angle sensors are used for the determination of an angle of rotation. Digital angle sensors principally consist of a pattern-bearing arrangement and a pattern-sensing sensor arrangement, which rotate relative with respect to each other corresponding to the relative motion of the two parts. In the case of incremental sensors the pattern-bearing arrangement is a disc or a wheel with marks distributed uniformly over the periphery, the marks being detected by the sensor arrangement and indicated by the generation of corresponding pulses. Successive pulses are counted as a function of the direction of rotation to determine the angle of rotation based on the accumulated sum. In order to use the latter for the determination of the actual position, a reference position must be pre-set and used as reference for the counted value. Usually, this reference position is identified by a separate reference or zero mark, which can be detected by the sensor arrangement. In the case of absolute sensors, however, the pattern is coded as a function of location so that for each angular position an individual sensor signal can be generated, thereby clearly indicating the respective position.

If the range of relative motion is greater than 360°, i.e., greater than one full rotation, the indication of an angular position produces ambiguous information concerning the actual degree of relative rotation. The same angular positions within successive full rotations cannot be distinguished from each other geometrically. In order to obtain an unambiguous indication, additional measures are required to allow the distinction between full rotations.

An appropriate known measure is a counting of passes as a function of the direction of rotation by means of a reference or zero angle position, as has been disclosed, for example, by literature references DE-C2-3,700,876 and DE-C1-19,508,607 in conjunction with a steering wheel sensor device. These latter known arrangements create particular problems, inasmuch as there is the risk that the counted value is lost when electrical power is shut off or altered due to counting errors; therefore, the entire counter must be initialized periodically in order to calibrate it to zero for a specific reference steering position.

In the known arrangements the selected reference point for initialization is that zero pass, which occurs when the center of the range of relative rotation of the steering wheel is passed and represents the straight-line driving direction. In the arrangement of reference DE-C2-3,700,876, the straight-line driving direction is identified by historical evaluation: a detected zero pass is considered the middle of the range of torsion, unless another zero pass is determined within a predetermined time after the former detection. In the arrangement of DE-C1-19,508,607, the straight-line driving direction is detected by a separate sensor, which recognizes the straight-line position of the steered wheels of the vehicle.

These above-described known devices are complex and susceptible to problems, inasmuch as counting errors, or even counting value losses, occur between initializations; and, therefore, a factor of uncertainty remains.

Reference WO-96/11514 discloses a spiral/pin gear drive. Provided on a stationary disc, concentric to the axis of rotation of the steering wheel, is a spiral groove, in which slides a pin revolving with the steering wheel shaft and which is movable in radial direction. The position of the pin comes into approximate alignment with a mark when the steering wheel reaches the center of its total range of relative rotation. This mark is located either directly on the path of movement of the pin or on the end of a rotary indicator, to which the pin motion is transmitted by means of a lever arm. The ends of the spiral grooves represent the stops for the steering wheel rotation. This known mechanism serves as a positioning aid during assembly of the steering system.

BRIEF SUMMARY OF THE INVENTION

The present invention solves the problem of providing a device for the determination of the degree of relative rotation between two parts or members in such a manner that the device is less prone to trouble; and, the degree of relative rotation between the two parts or members is indicate&reliably, even over more than one full rotation.

In the present invention the second detector device, which provides information permitting the distinction between full rotations, comprises a gear drive driven by the rotation of the two parts with respect to each other and an absolute position sensor for the determination of the position of a measuring element moved by the gear drive. The gear drive has dimensions such that the maximum possible range of the relative rotation of the two parts corresponds to a range of motion of the measuring element, within which all positions can be distinguished from each other by geometric means and which can be resolved by the position sensor at a resolution corresponding to the full rotations between the two parts or members.

The present invention has the advantage that a repeated initialization of the second detector arrangement is not required. When full rotations of the parts occur, the movement of the measuring element remains within a range, the locations of which can be differentiated directly and absolutely. As rotary movements greater than 360° occur, an absolute position sensor on the measuring element is capable of making a direct distinction between individual full rotations. The position sensor can be relatively compact and simple, because its resolving capabilities need to correspond only to the number of maximum possible full rotations of the two parts or members.

In one advantageous embodiment of the present invention the gear drive comprises a spiral groove extending concentrically to the main axis on the surface of a disc mounted to a first part and having a number of convolutions corresponding at least to the number of possible full rotations. A pin engages with the spiral groove, the pin being supported on the second part in such a manner that the radial position of the pin changes with respect to the main axis during the movement of the two parts with respect to each other. Mechanical means are used for the connection of the pin with the measuring element.

In the present invention the available absolute position sensor preferably comprises an array of sensor elements mounted to the second part and a sensor object connected with the measuring element. The sensor object moves past the sensor element array when the measuring element is moving, in order to affect, i.e., energize or deenergize, an individual selection of sensor elements in the same manner for each position range, corresponding respectively to a specific full rotation between the parts.

The sensor elements may be light barriers, for example, bifurcated light barriers, whereby the sensor object represents a light-blocking diaphragm array for the selective deenergization of the photoreceivers, or reflected-light barriers, whereby the sensor object is a reflecting array for the selective energization of the photoreceivers. The sensor elements may also be configured as a CCD camera or as specific optical ASICs. Instead of optoelectric sensor elements, it is also possible to use inductive or capacitive elements or elements operating with ultrasound.

The range of motion of the measuring element may be kept relatively narrow because its determination of location may occur with relatively minor resolution. On the other hand some sensor elements such as, for example, light barriers or inductive sensors cannot be configured as small as desired. In one advantageous embodiment of the present invention it is permissible, measured in the direction of movement of the sensor object, for the detection range of the sensor element array and the length of the sensor object to be considerably greater than the maximum deflecting range of the sensor object. In order to permit the absolute determination of location, the sensor object in this case has several partial divisions spaced along its length. These divisions are different from those of the sensor elements such that, for each position range of the sensor object corresponding to a specific full rotation range between the parts, an individual selection of sensor elements is affected in the same sense.

In an alternative embodiment of the present invention, the sensor object may be undivided in its direction of movement and have a length such that it may extend over a number of two or more adjacent sensor elements. This number, preferably, is smaller by 1 (one) than the total number of sensor elements, which, in turn, is preferably smaller by 2 (two) than the number of possible full rotations between the parts. This reduces the risk of ambiguities along the boundaries between respectively two full rotations.

The position sensor can be located directly on the path of movement of the pin sliding in the spiral groove in order to monitor a measuring element placed directly on the pin. In an alternative embodiment, however, the pin movement is transmitted to a measuring shaft by rigidly mounting the pin to the end of an arm, which, in turn, is rigidly connected with the measuring shaft. The latter is rotatably supported in the second of the two parts or members and its axis extends parallel to the main axis; and, the position sensor is designed to determine the position of rotation of the measuring shaft. In this case the sensor object, for example, an aperture array with bifurcated light barriers as sensor elements, preferably is an arcuate element, which is mounted to the measuring shaft and extends in concentric direction to the shaft axis, whereby the sensor elements are arranged appropriately in the manner of a circular arch.

The rotation-imparting element of the first detection arrangement, which indicates the angular position of the two parts or members relative to each other within one full rotation, may be configured in any manner. It may operate with an incremental or any analog or digital absolute angle sensor. In a particular embodiment of the present invention, an angle sensor is used, which comprises a sensor object configured as a pattern disc mounted to the first part or member and having on its periphery a rim with a detectable pattern, and comprises an array of sensor elements mounted to the second part or member for the generation of electrical pulses as the pattern passes. One of the advantages of this embodiment is that the spiral groove can be provided on a surface of the pattern disc. Design advantages may result when the patterned rim projects in the axial direction from the edge of the pattern disc.

The sensor elements of the angle sensor of the first detector arrangement and the sensor elements of the position sensor of the section detector arrangement preferably are located on opposite surfaces of a support disc retained on the second part.

Preferably, the second part is stationary and the first part is rotatable. This applies in particular to the use of the invention for the determination of the relative rotation of the steering wheel of a motor vehicle; in this case the steering wheel shaft constitutes the rotatable of the two parts or members while the support of the steering wheel shaft constitutes the second of the two parts or members.

DETAILED DESCRIPTION OF THE INVENTION

Figure 1:
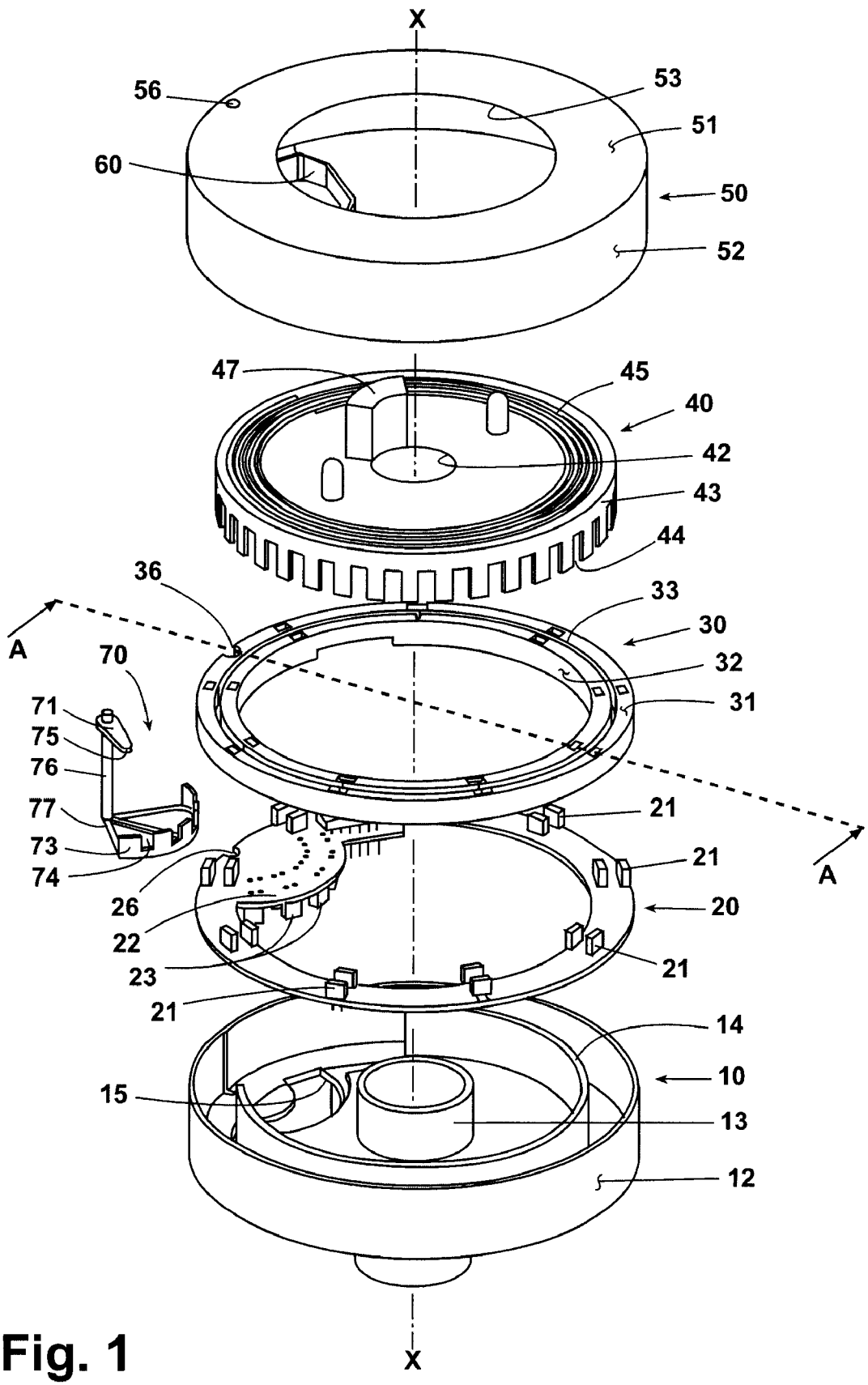
FIG. 1 is a pulled-apart perspective illustration of the essential parts of one form of embodiment of an inventive rotation-measuring device, viewed at an angle from the top.
Figure 2:
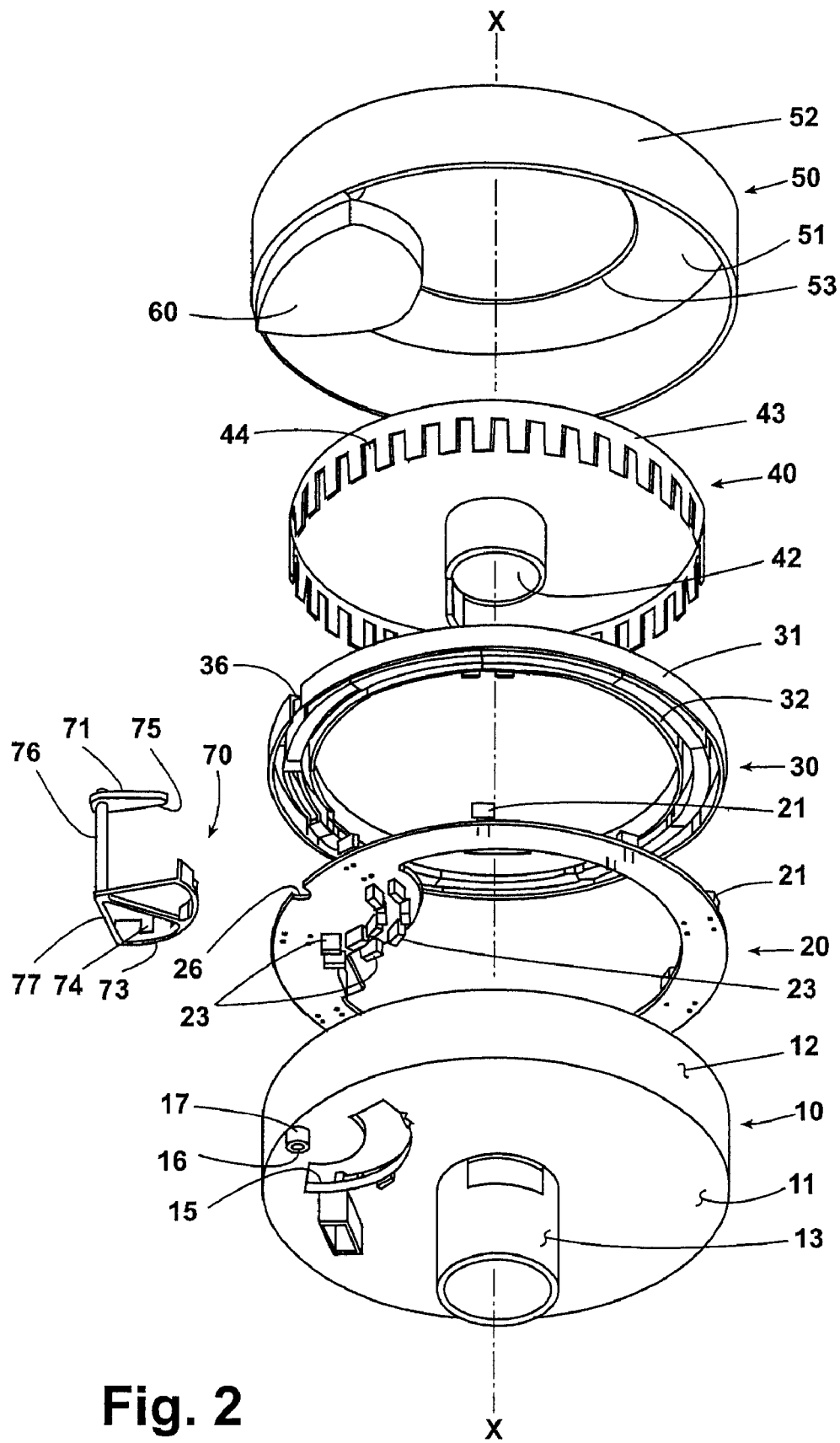
FIG. 2 is the parts shown in FIG. 1, viewed at an angle from the bottom.
Figure 3:
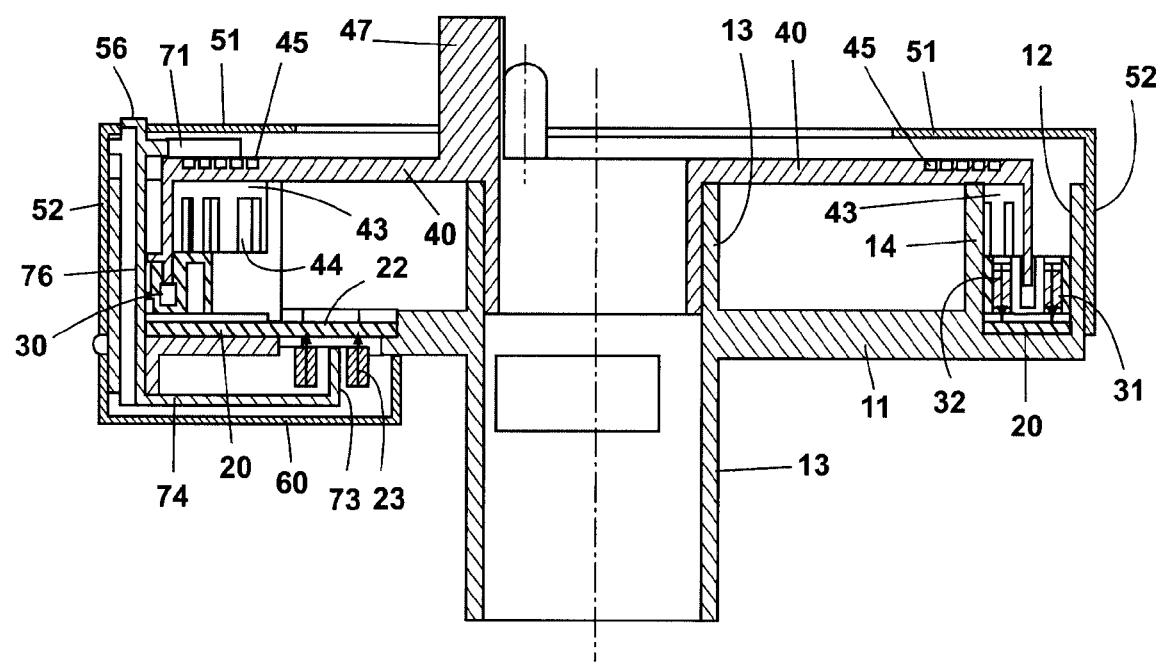
FIG. 3 is an assembled device, viewed in section along line A—A of FIG. 1.

The illustrated rotation-measuring device is configured such that it can be mounted to the steering column of a vehicle in order to determine the degree of relative rotation of the steering wheel. The parts of the steering wheel and its shaft, as well as the support for the steering wheel, are not illustrated to avoid confusion. The dashed line denoted X—X represents the steering wheel axis.

The device has a lower housing part indicated generally at 10 with a circular bottom 11, whereby a cylindrical exterior wall 12 extends in upward direction from the exterior edge of the bottom 11. An adjoining cylindrical sleeve or inner wall 13 extends through the center of bottom 11 and upwardly to the same height as exterior wall 12. Between sleeve 13 and exterior wall 12 there extends concentrically a central or radially intermediate wall 14, which has the same height and is also an integral part of bottom 11 and is not completely closed in peripheral direction but, instead, has two ends. Between the ends of central wall 14, bottom 11 has a cutout 15 having the shape of a circular arc. This circular arc extends in space concentric relationship to a hole 16 close to exterior wall 12, the hole 16 being provided in bottom 11 and adjoined on the underside of bottom 11 by an integral relatively small support collar 17.

The annular space between exterior wall 12 and central wall 14 of lower housing part 10 accommodates an essentially annular support disc 20 fixed in the housing. The upper side of said support disc 20 has arranged on it a plurality of first bifurcated light barriers 21 distributed in peripheral direction. Support disc 20 has an inwardly-extending arcuate segment 22 at a location, which corresponds to the position of arcuate cutout 15 in bottom 11 of the lower housing part. On the lower side of arcuate segment 22 is mounted an array comprising a plurality of second arcuate bifurcated light barriers 23 concentric to a notch 26 provided on the external edge of support disc 20. In the assembled condition of the device, light barriers 23 extend downwardly out of cutout 15 of housing bottom 11.

A guard ring indicated generally at 30, essentially having the same exterior and interior diameters as support disc 20, is positioned in a non-rotatable manner on support disc 20. Guard ring 30 is composed of two connected concentric parts 31 and 32 surrounding light barrier array 21 on the outside and inside. An annular gap 33 is formed in the upper side of guard ring 30 between parts 31 and 32, the gap 33 providing peripheral access to the detection area of bifurcated light barriers 21.

A disc indicated generally at 40 located on the same axis as guard ring 30 can be rotated relative with respect to the housing and, therefore, also with respect to guard ling 30 and support disc 20. Disc 40 has a central opening 42 and is provided on its external edge with a cylindrical rim 43 extending in a downward direction and having a pattern of slits 44 or castellations distributed over its periphery. From the top, this rim 43 comes into engagement with annular gap 33 of guard ring 30 and extends into the detection range of light barriers 21. The upper side of disc 20 is provided with a spiral groove 45 consisting of several complete convolutions about the center point of disc 40. The illustrated embodiment has five convolutions.

A sliding pin 75, being a component of a gear drive mechanism indicated generally at 70, comes into engagement with spiral groove 45. Mechanism 70 will be described later in detail.

An upper housing part indicated generally at 50 has an annular cover wall 51, from the external edge of which a cylindrical, lateral or side wall 52 extends in downward direction. Cover wall 51 has a large central opening 53. Lateral wall 52 is slipped, from the top, over the lateral wall 12 of lower housing part 10 and retained there by suitable means at such a height that a certain free space remains between the upper side of disc 40 and the underside of cover wall 51.

Another housing part in the form of a cap 60 is provided and which covers the area of the arcuate cutout 15 in bottom 11 of lower housing part 10; and, thus cap 60 covers the array of light barriers 23 from the bottom.

Hereinafter, the details of the mentioned gear drive mechanism 70 will be described. This mechanism comprises an arm 71, with sliding pin 75 mounted to one end thereof. The other end of arm 71 is rigidly connected with a measuring shaft 76 extending parallel to main axis X—X. A lower section of measuring shaft 76 is rotatably supported in hole 16 in support collar 17 at the bottom 11 of lower housing part 10. The upper end of measuring shaft 76 is supported rotatably in hole 56 formed in cover wall 51 of upper housing part 50.

Notch 26 on the exterior rim of support disc 20 is designed for engagement with measuring shaft 76. This engagement secures support disc 20 against rotation and ensures that the arcuate array of second light barriers 23 on the underside of support disc 20 is aligned concentric with measuring shaft 76. A similar notch 36 on guard ring 30 secures this element against rotation.

In the range of detection of the arcuate light barrier array, i.e., the location of the circular line between emitters and receivers of the bifurcated light barrier 23, extends an arcuate light-blocking member 73, which is connected by spoke-like strips 77 in a rigid manner with the lower end of measuring shaft 76 and extending out of the support collar 17 and having several spaced slits 74. Light-blocking member 73 represents the "sensor object" of light barrier array 23.

For operation, lower housing part 10 is non-rotatably connected with a first part, i.e., with the support of a steering wheel, in that sleeve 13 is locked together with the (not illustrated) steering column collar. Lower housing part 10 also retains upper housing part 50, the location of measuring shaft 76, support disc 20 and guard ring 30. However, disc 40 having the patterned rim remains rotatable. A second part (not illustrated) steering wheel, is connected in a non-rotatable manner with disc 40, for example, by locking it together with a projection 47 of disc 40, whereby the steering wheel shaft extends through central opening 42 of disc 40.

If disc 40 is rotated by rotating the steering wheel, the pattern of slits 44 moves as the sensor object through the detection ranges of bifurcated light barriers 21, which, as a result, are opened and closed in order to produce electrical signals as a function of rotary motion. The actual rotary position can be deduced from the evaluation of the electrical signals. Disc 40 and light barriers 21 form a rotation-imparting element. In the illustrated embodiment, this rotation-imparting element is configured as an absolute angle sensor. To accomplish this, the pattern of slits 44 over the periphery of rim 43 has a so-called chain code, i.e., the division of the slits is not uniform but varies over the periphery corresponding to a cyclically permutated chain code. In the illustrated embodiment, there are 9 (nine) permutation cycles over the periphery; and, the number of light barriers 21 distributed over the periphery of support disc 20 corresponds thereto. Upon appropriate decoding, output signals of light barriers 21 produce an absolute indication of the angular position of disc 40 in the range between 0° and 360°.

During each full rotation of disc 40, the light barrier signals repeat identically so that individual full rotations cannot be distinguished from each other based on these signals. The additional sensor system, which consists of the arrangement of two light barriers 23, permits such a distinction.

Arm 71 and light-blocking member 73 are arranged relative to each other on measuring shaft 76 in such a manner that light-blocking member 73 assumes its central position on the arcuate light barrier array 23, when sliding pin 75 on the end of arm 71 is located in the center of the length of spiral groove 45. In the illustrated example, in which spiral groove 45 has exactly 5 (five) full convolutions, this location represents the center of the third convolution. At the time the device is assembled, before sliding pin 75 is set in spiral groove 45, the rotary position of measuring shaft 70 and the rotary position of disc 40 are aligned appropriately with respect to each other.

During the rotation of disc 40, pin 75 sliding in spiral groove 45 travels toward the inside or outside, depending on the direction of rotation. In so doing, pin 75 describes a circular path concentric to measuring shaft 76 and rotates shaft 76 accordingly. It will readily be seen that, care must be taken that this circular path crosses all the convolutions of spiral groove 45. The rotation of measuring shaft 76 results in a corresponding deflection of light-blocking element 73 in the detection range of light barriers 23.

The arrangement of light barriers 23 and the arrangement of slits 74 in light-blocking member 73 are selected in such a manner that no absolute position sensor is created. In the simplest form of the invention, it may be sufficient to provide one single slit 44 and a number of light barriers 23 equal to the number of convolutions of spiral groove 45. The divisions of light barriers 23 must then be such that they correspond to the moving path of light-blocking member 73 for each full rotation of disc 40, so that for each full rotation respectively one unambiguously associated unit of light barriers 23 is opened. However, this may involve design problems when the moving path of the light-blocking member is relatively small and in the event correspondingly small light barriers are not available or are too expensive.

In order to eliminate this problem in the illustrated embodiment, several slits 44 are provided in the light-blocking member 73, these being distributed over a length essentially greater than the moving path of light-blocking member 73. Therefore, the length of the light barrier array is correspondingly greater and so is the distance between light barriers 23, which, therefore, need not be very small. As a result of the specific dimension of the division of slits 44 in relation to the division of light barriers 23, it can be ensured that in the different positions of light-blocking member 73, which correspond to different full revolutions of disc 40, respectively, different combinations of light barriers 23 are opened and/or closed. As a result of this "coding," the light barrier signals provide an unambiguous distinction between the individual full rotations of disc 40.

One alternative suitable for longer paths of movement and requiring only relatively few light barriers 23 for the absolute position sensor is to configure light-blocking member 73 without slits and provide light barriers 23 with a length in the direction of movement long enough that said light-blocking member can block respectively two or more adjacent light barriers 23 at the same time. If, for example, five full rotations need to be distinguished, three light barriers A, B and C are adequate, provided the length of the light-blocking member is large enough that it can cover respectively two adjacent light barriers. Considering five different full rotation ranges, the following distinguishable situations can be created:

| Light Barrier: | A | B | C |
| --- | --- | --- | --- |
| Rotation 1: | Light | Light | Light |
| Rotation 2: | Dark | Light | Light |

-continued

| Light Barrier: | A | B | C |
| --- | --- | --- | --- |
| Rotation 3: | Dark | Dark | Light |
| Rotation 4: | Light | Dark | Dark |
| Rotation 5: | Light | Light | Dark |

If a distinction needs to be made among six full rotations, four light barriers A, B, C, and D are adequate, provided that the length of the light-blocking member is selected large enough that it can cover respectively three adjacent light barriers. Considering six different full rotation ranges, the following distinguishable situations can be created:

| Light Barrier | A | B | C | D |
| --- | --- | --- | --- | --- |
| Rotation 1: | Dark | Light | Light | Light |
| Rotation 2: | Dark | Dark | Light | Light |
| Rotation 3: | Dark | Dark | Dark | Light |
| Rotation 4: | Light | Dark | Dark | Dark |
| Rotation 5: | Light | Light | Dark | Dark |
| Rotation 6: | Light | Light | Light | Dark |

Generally, the following is applicable: The number n of light barriers is selected smaller by 2 than the number of possible full rotations and the length of the light-blocking member is selected in such a manner that it may reach over n−1 light barriers. The combination of the absolute position sensor, which consists of the light-blocking member on mechanism 70 and light barriers 23, with the rotation-imparting element, which consists of peripheral rim 43 and light barriers 21, produces information regarding the degree of relative rotation of the steering wheel in the range of more than one full rotation. Position sensor 73, 23 identifies approximate information for various full rotations; and, rotation-imparting element 43, 21 indicates as precise information the angular position within each full rotation. After a one-time alignment of the angular position of disc 40 at the time the device is assembled, only one single adjustment is required when the device is locked on the steering mechanism; this permits that the center of the total rotation range of the steering wheel, i.e., the steering position for straight-line driving, is positioned on the center of the adjustment range of the position sensor.

In connection with the steering apparatus of a motor vehicle, the inventive device provides a relatively trouble-free means for the production of reliable information regarding steering deviations. This information can be used, for example, in systems for steering assistance, navigation assistance, motor vehicle dynamics control and the like.

The present invention is not restricted to the embodiment shown by the drawings, but leaves room for modifications, some of which have already been suggested. The rotation-imparting device may also be provided with a different code pattern than the described one; an incremental angle sensor without coding may be used in conjunction with a counter.

The information provided above regarding the bifurcated light barriers and the diaphragm array can be applied in the same manner to different types of sensor elements or matching sensor objects as have already been described as examples herein. However, the absolute position sensor can also be an analog sensor such as, for example, a potentiometer. In this case the measuring element can move the sliding potentiometer element; furthermore, it is also possible to configure the measuring element as moving potentiometer path. In the latter case the potentiometer path may be a resistive coating in one spiral groove provided on a disc similar to disc 40, while the sliding element is configured as a pin in engagement with the groove similar to sliding pin 74. In such an arrangement, the electrical leads of the potentiometer would be partially flexible and could be wound in such a manner that they provide play for several full rotations between the two parts or members.

The invention herein is not restricted to the use on a motor vehicle steering mechanism but may be used advantageously wherever the relative rotation of any two parts or members over a limited number of full rotations is to be determined in a precise and reliable manner.

What is claimed is:

1. A device for the determination of the degree of relative rotation between two members about a main axis, said device comprising:

a first detector arrangement, the first detector arrangement including:

a lower housing part having a bottom, an outer wall, and an inner wall, the inner and outer walls extending from the bottom and having a generally cylindrical shape and being centered on the main axis, the inner wall having a diameter smaller than a diameter of the outer wall, the lower housing part further including an intermediate wall and a cutout in the bottom, the intermediate wall extending from the bottom and being between the inner and outer walls and having a generally cylindrical shape not completely closed in peripheral direction;

an annular support disk being supported by the outer and intermediate walls, the annular support disk having an upper side with a first bifurcated light barrier array distributed in peripheral direction, the annular support disk having an inwardly-extending arcuate segment corresponding to the cutout, the arcuate having a lower side with a second bifurcated light barrier array;

a guard ring having an annular gap and being fixedly positioned on the annular support disk, the annular gap providing access to a detection range of the first bifurcated barrier array;

a disc centered on the main axis and being mounted with respect to the guard ring and the annular support disk, the disc having a center opening and a cylindrical rim provided on its external edge, the cylindrical rim extending downward and having a pattern of slits, the rim engaging the annular gap and extending into the detection range of the first bifurcated barrier array; and, a second detector arrangement including:

a spiral groove provided on an upper side of the disc and consisting of a plurality of convolutions;

gear mechanism having a measuring shaft, an arm and a sliding pin engaging the spiral groove, the arm being connected to the measuring shaft and the sliding pin being connected to the arm, the arm being connected to the lower housing part; and, a light-blocking member connected to the measuring shaft and having several spaced slits extending into a detection range of the second bifurcated barrier array, wherein the first detector arrangement is adapted to determine the degree of relative rotation between 0° and 360° and the second detector arrangement is adapted to distinguish between full rotations.

* * * * *